United States Patent [19]

Shimura et al.

[11] Patent Number: 5,966,279
[45] Date of Patent: *Oct. 12, 1999

[54] ROTARY MAGNETIC HEAD INSPECTION METHOD

[75] Inventors: Sadao Shimura; Tadashi Adachi, both of Yamagata, Japan

[73] Assignee: Mitsumi Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,224

[22] Filed: Oct. 29, 1996

[30] Foreign Application Priority Data

Oct. 31, 1995 [JP] Japan ..................................... 7-306711

[51] Int. Cl.⁶ ..................................................... G11B 27/36
[52] U.S. Cl. .............................................. 360/137; 360/31
[58] Field of Search .................................. 360/31, 53, 137, 360/61, 64, 104

[56] References Cited

U.S. PATENT DOCUMENTS 5,625,503   4/1997   Sasajima ..................................... 360/25

Primary Examiner—Andrew L. Sniezek
Attorney, Agent, or Firm—Whitham, Curtis & Whitham

[57] ABSTRACT

A rotary magnetic head inspection method for a double azimuth head where two magnetic heads of different azimuthal angles are arranged on a head base, includes the steps of: recording an inspection signal on a running tape by a magnetic head; reproducing the inspection signal by the magnetic head for checking the level of the reproducing signal; and reproducing the inspection signal by the other magnetic head for checking whether the magnetic head is correctly assembled onto a head base through judgement of the reproducing signal.

7 Claims, 5 Drawing Sheets

ROTARY MAGNETIC HEAD INSPECTION METHOD

BACKGROUND OF THE INVENTION

1. Field of the invention

The present invention relates to rotary magnetic heads utilized in video tape recorders and digital audio recorders, and particularly relates to a method of inspecting the magnetic heads to find whether each of them are properly assembled onto a rotary drum or not.

2. Related art

It is well known that what is called "a double azimuthal head" as shown in FIG. 3(a) is utilized for the rotary drum X of the video tape recorder or the digital audio tape recorder which records and reproduces at a reference speed and at the twice-faster speed, and two pairs of magnetic heads are assembled on the rotary drum in such manner that each head confronts the other in the diametric direction. In FIG. 3(b), a magnetic head A and a magnetic head C are the recording and reproducing heads for the first channel and a magnetic head B and a magnetic head D are the recording and reproducing heads for the second channel.

In a conventional inspection process of the rotary magnetic heads, each of the magnetic heads A through D is judged to be proper or improper by such method as shown in FIG. 5, where a magnetic tape is fed at the reference speed (Step $S_a$) and, after a reference signal is recorded on the aforenamed magnetic tape by the magnetic head A (Step $S_b$), the inspection apparatus is set to the reproducing mode to reproduce the reference signal which has been recorded by the aforenamed magnetic head A (Step $S_c$) to judge whether the recorded signal is higher than the reference level (Step $S_d$); if it is lower than the reference level, a troubleshooting measure, such as illumination of a warning lamp, is taken (Step $S_e$).

In the aforenamed way, the aforenamed inspection process is repeated for the magnetic heads B through D till all the magnetic heads are checked whether they meet the reference value.

As FIG. 4 shows, each of the magnetic heads A through D has an azimuthal angle $+\theta_1$, $\theta_2$, $-\theta_2$ or $-\theta_1$ and, if these magnetic heads A through D are assembled onto a head base 1 shown in FIG. 3(a) in a incorrect way, the expected functions cannot be exercised.

What has been inconvenient with the conventional inspection method as described above is that the magnetic heads A through D are judged only to be good or defective from their respective performance; whether or not the magnetic heads A through D are properly assembled onto the head base 1 is not inspected.

SUMMARY OF THE INVENTION

With consideration to the present state of the conventional method of the rotary magnetic head inspection, one object of the present invention is to provide a rotary magnetic head inspection method which allows judgement between correct and incorrect assembly onto the head base.

To achieve this object, the present invention provides a rotary magnetic head inspection method for a double azimuth head, where two magnetic heads of different azimuthal angles are arranged on a head base, which comprises as its features: a process where an inspection signal is recorded on a running tape by a magnetic head to be judged whether correct or not; a process where the signal recorded in the previous process is reproduced by the aforenamed magnetic head for checking whether it is good or defective with reference to the level of the reproduced signal; and a process where the aforenamed recorded signal is reproduced by the other magnetic head for checking whether the aforenamed magnetic head is correctly assembled onto the head base through judgement of the reproduced signal level.

According to the present invention, since the reference signal which has been recorded by a single magnetic head is reproduced by the same magnetic head and the other magnetic head to provide the propriety judgement data, the present invention is effective in that the respective performance inspections of the magnetic heads and the judgement on correct state of assembly onto the head base are conducted simultaneously.

DETAILED DESCRIPTION OF THE PREFERRED EMBODIMENTS

An embodiment of the present invention is described in detail in the following paragraphs with references to FIGS. 1 and 2.

Figure 1:
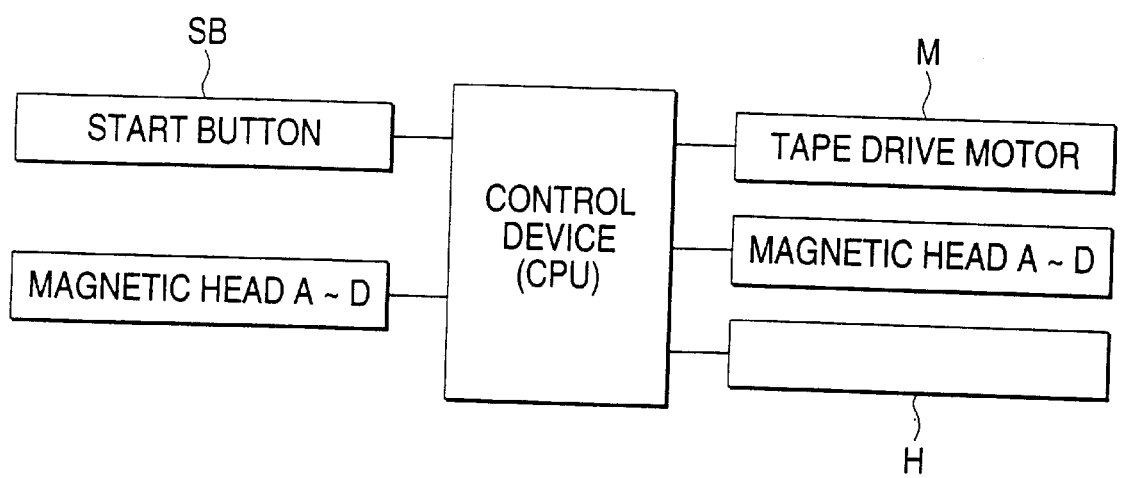
FIG. 1 is a block diagram of an inspection apparatus utilized in the present invention

FIG. 1 is a block diagram of the inspection apparatus utilized in the present invention, where a control unit consisting of a CPU receives a signal from a start button SB for starting of the inspection and reproduced signals from the magnetic heads A through D.

On receiving the input from the start button, the control unit CPU starts a tape drive motor M rotating and loads the reference signal to a designated one of the magnetic heads A through D. After recording on the magnetic tape, the aforenamed control unit CPU conducts reproduction by the designated one of the magnetic heads A through D, checks the reproduced signal level and indicates it as a defective magnetic head on a judgement display H if the aforenamed level is lower than the reference level.

Figure 2A:
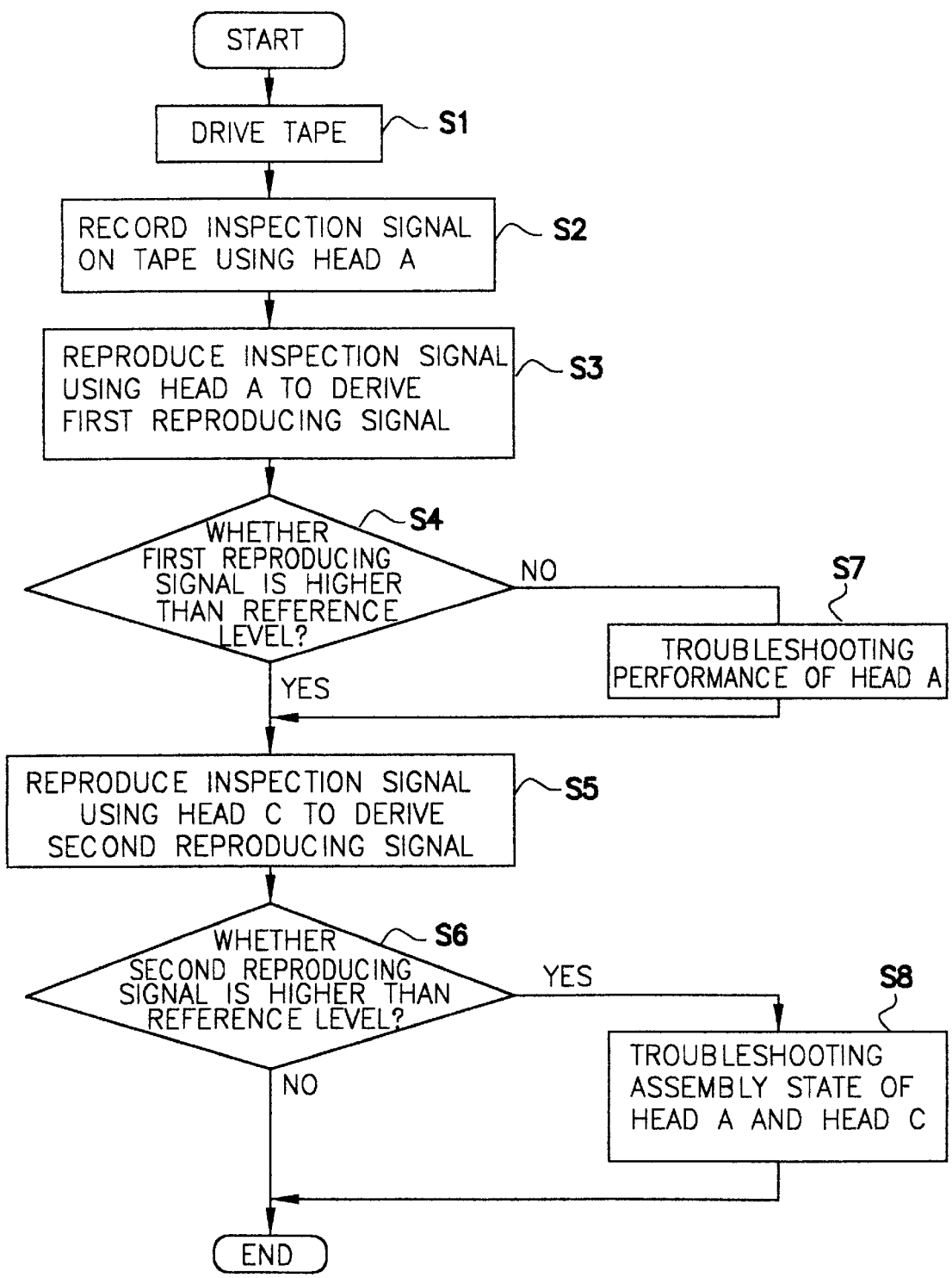
FIG. 2a is a flowchart of an inspection method by the present invention.
Figure 2B:
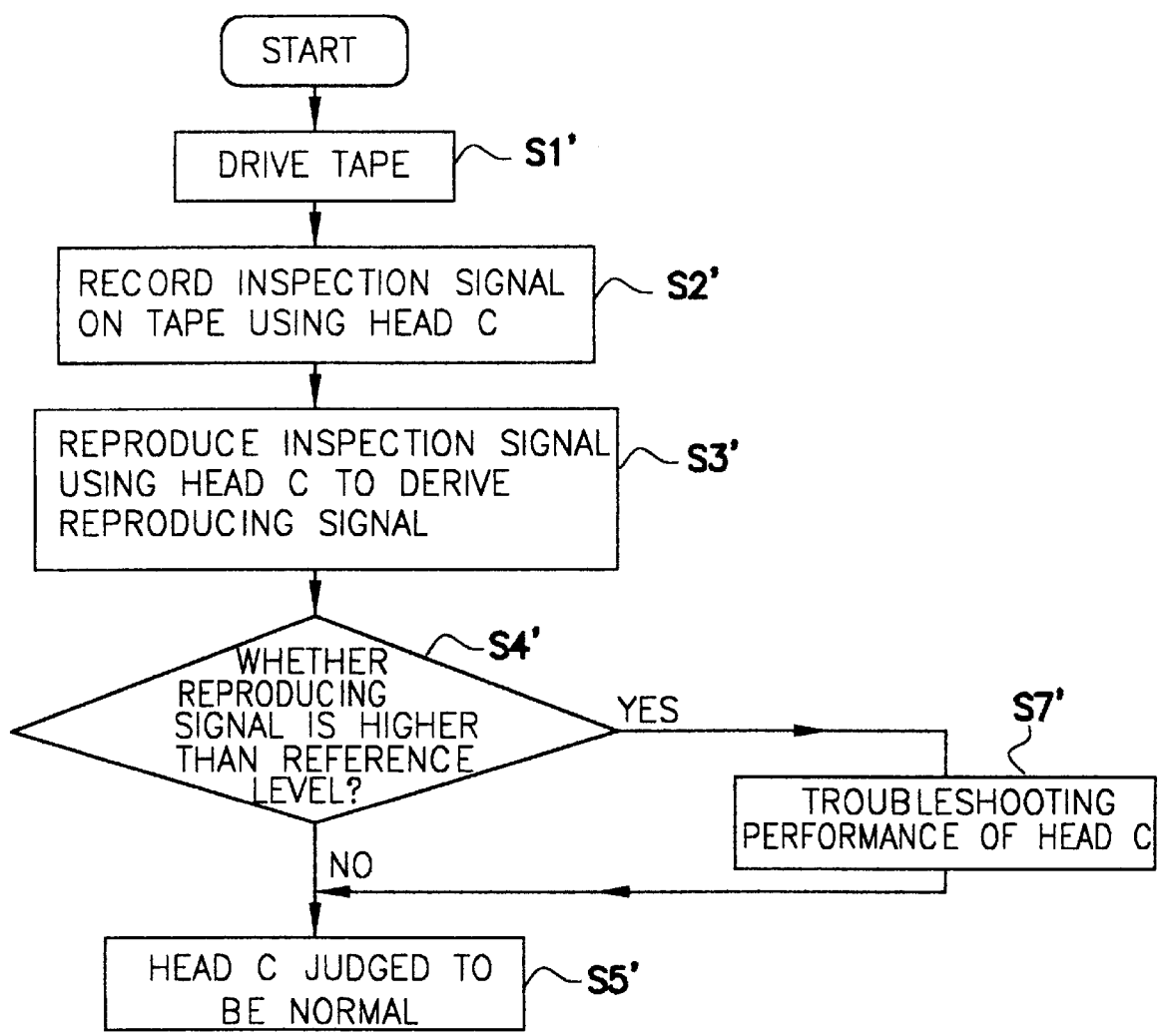
FIG. 2b is another flowchart showing the method of the present invention.
Figure 3:
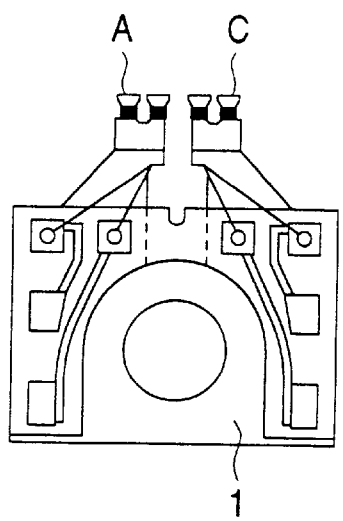
FIGS. 3(a) and (b) illustrate an ordinary double azimuth head.
Figure 3:
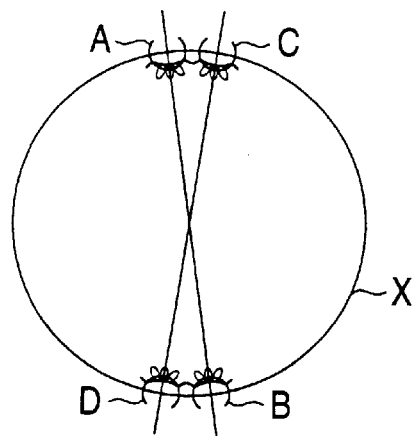
Figure 4:
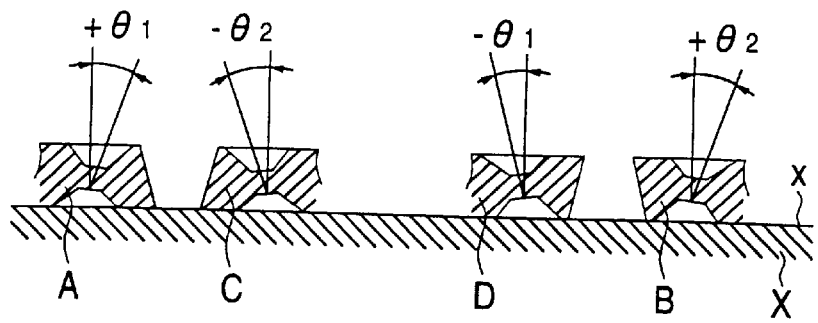
FIG. 4 is an expansion plan of the aforenamed double azimuth head.
Figure 5:
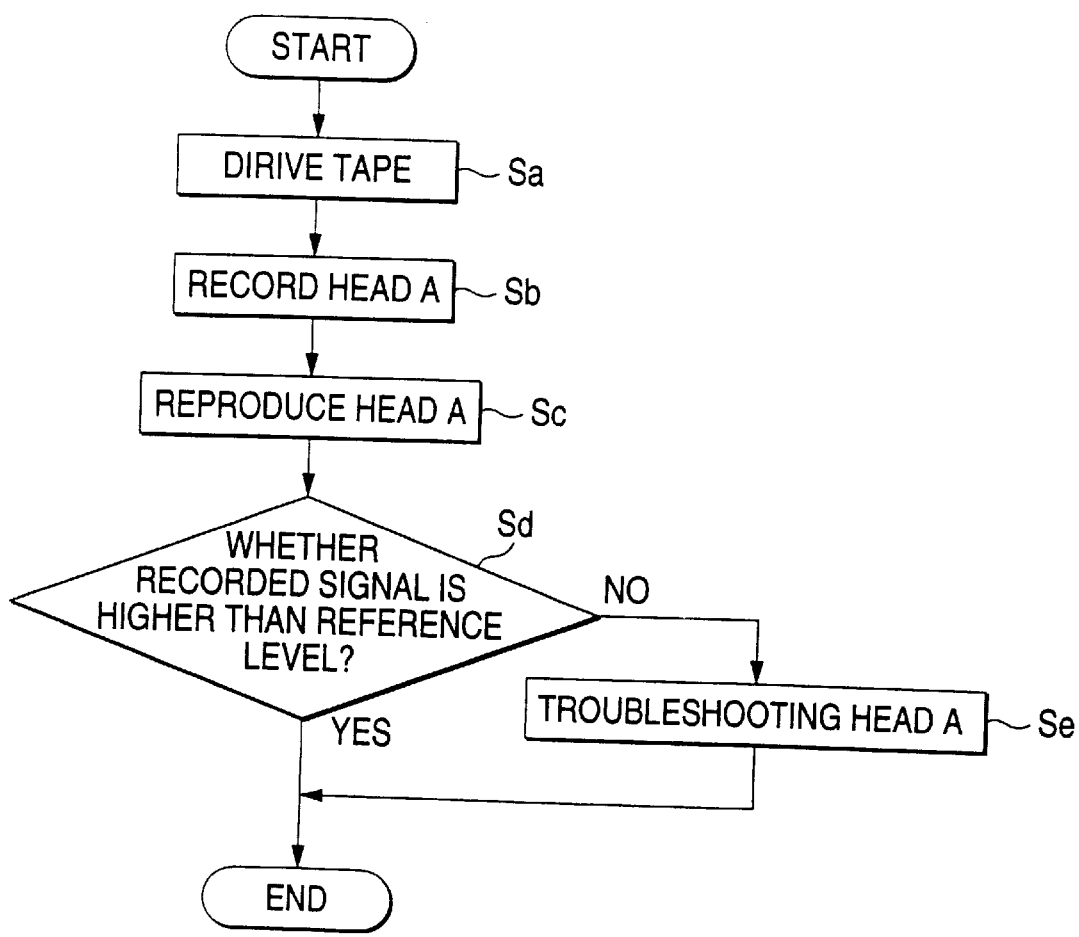
FIG. 5 is a flowchart of a conventional inspection method.

FIG. 2a shows a flowchart of the inspection method of the present invention where, when the start button SB is pressed, the magnetic tape is driven by the control unit CPU at a running speed which corresponds to the magnetic head A (Step $S_1$); the reference signal prepared by the control unit CPU is loaded on the magnetic head A and the magnetic head A records the reference signal on the magnetic tape for a prescribed period of time (Step $S_2$). Nextly, the magnetic head A is set to the reproducing mode to reproduce the recorded signal (Step $S_3$).

The signal reproduced by the magnetic head A is transmitted to the control unit CPU and compared with the reference level which is prepared by the aforenamed control unit CPU (Step $S_4$). If the reproduced signal is not higher than the reference level, troubleshooting the performance of head A is performed. (Step S7). If the reproduced signal is higher than the reference level, no troubleshooting of head A is undertaken to correct its performance.

Nextly, the magnetic head C reproduces the signal recorded by the magnetic head A (Step $S_5$) and the aforenamed reproduced signal is compared again with the reference level (Step $S_6$); if no abnormality is found, i.e., if the signal reproduced by head C is not higher than the reference level, the performance of the magnetic head A is judged to be normal and the assembly state of the magnetic heads A and C onto the head base is also judged to be normal. On the other hand, if the signal reproduced by head C is higher than the reference level, an abnormality in assembly state is detected. Nextly, in the same way as described above regarding the magnetic head A, when the start button SB is pressed, the magnetic tape is driven by the control unit CPU at a running speed which corresponds to the magnetic head C (Step $S_1$'); the reference signal prepared by the control unit CPU is loaded on the magnetic head C and the magnetic head C records the reference signal on the magnetic tape for a prescribed period of time (Step $S_2$'). Nextly, the magnetic head C is set to the reproducing mode to reproduce the recorded signal (Step $S_3$').

The signal reproduced by the magnetic head C is transmitted to the control unit CPU and compared with the reference level which is prepared by the aforenamed control unit CPU (Step $S_4$'); and; if no abnormality is found, i.e., if the signal reproduced by head C is higher then the reference level, the performance of magnetic head C is also judged to be normal and the inspection on the magnetic heads A and C is concluded.

However, if the reproduced signal is lower than the reference level when the reproduced signal is compared with the reference level at the above-described Steps $S_4$', an alarm is given from the control unit CPU and the alarm lamp of the judgement display H is illuminated (Step $S_7$') to warn of respective abnormality in the performance reproduced of the magnetic heads A and C.

If the reproduced signal is higher than the reference level when the reproduced signal is compared with the reference level at the above-described Step $S_6$, an alarm is given from the control unit CPU and the alarm lamp of the judgement display H is illuminated (Step $S_8$) to warn of abnormality in the assembly state of the reproduced magnetic heads A and C.

Although the above-described embodiment has a constitution where the signal reproduced by the magnetic head A is immediately compared with the reference level at the time of input into the control unit CPU at Step $S_4$, it will make no difference even if the reproduced signal transmitted to the control unit CPU may be compared with the reference level at the time when the signal reproduced by the magnetic head C is compared with the reference level at Step $S_6$.

Additionally, the magnetic head B and D for the second channel are inspected after the above-described magnetic head A and C for the first channel in an actual inspection process and the inspection process of the magnetic heads B and D proceeds in accordance with an analogous application of exactly the same steps as the above-described magnetic heads A and C.

As the above paragraphs have elucidated, since the reference signal which has been recorded by a single magnetic head is reproduced by the same magnetic head and the other magnetic head to provide the propriety judgement data, the present invention is effective in that the respective performance inspections of the magnetic heads and the judgement on correct state of assembly onto the head base are conducted simultaneously.

What is claimed is:

1. A rotary magnetic head inspection method for a double azimuth head device, where two magnetic heads of different azimuthal angles are arranged on a head base, comprising steps of:

recording an inspection signal on a running tape by a first magnetic head;

reproducing the inspection signal by said first magnetic head to derive a first reproducing signal;

checking a level of the first reproducing signal;

reproducing said inspection signal by a second magnetic head to derive a second reproducing signal; and checking whether at least one of said first magnetic head and said second magnetic head is correctly assembled onto the head base by comparing the second reproducing signal to a reference level.

2. The method of claim 1 further comprising:

determining whether an abnormality exists in performance of said first magnetic head based on said step of checking a level of the first reproducing signal.

3. The method of claim 2, further comprising:

loading a second inspection signal into said second magnetic head;

recording the second inspection signal on magnetic tape using said second magnetic head;

reproducing the second inspection signal from said magnetic tape using said second magnetic head to derive a third reproducing signal;

comparing the third reproducing signal with a second reference level; and determining whether an abnormality exists in performance of said second head based on an outcome of said step of comparing the third reproducing signal with said second reference level.

4. A method for inspecting a recording apparatus having first and second heads assembled on a base, said method comprising:

recording an inspection signal on a recording medium using said first head;

reproducing the inspection signal from said recording medium using said second head to derive a first reproduced signal; and comparing said first reproduced signal with a reference signal to determine whether an abnormality exists in an assembly state of at least one of said first head and said second head.

5. The method of claim 4, further comprising:

reproducing the inspection signal from said recording medium using said first head to derive a second reproduced signal;

comparing said second reproduced signal with the reference signal; and determining whether an abnormality in performance exists for said first head based on said step of comparing said second reproduced signal with the reference signal.

6. The method of claim 5, further comprising:

recording a second inspection signal on said recording medium using said second head;

reproducing the second inspection signal from said recording medium using said second head to derive a third reproduced signal; and comparing said third reproduced signal to a second reference signal to determine whether an abnormality in performance of said second head.

7. The method of claim 4, wherein said first head and said second head are magnetic heads and wherein said recording medium is magnetic tape.

* * * * *